United States Patent [19]

Richards, Jr.

[11] 4,185,799
[45] Jan. 29, 1980

[54] AIRCRAFT PARTITION MOUNTING ASSEMBLY

[75] Inventor: Edward W. Richards, Jr., Kent, Wash.

[73] Assignee: Boeing Commercial Airplane Company, Seattle, Wash.

[21] Appl. No.: 886,364

[22] Filed: Mar. 14, 1978

[51] Int. Cl.$^2$ .......................... B64C 1/20; B64C 1/22; B64C 1/28; B64D 11/00
[52] U.S. Cl. ................... 244/118.5 R; 52/238; 410/130; 410/105
[58] Field of Search ................. 52/235, 238, 241, 242, 52/243, 265, 272, 285, 509, 573, 617, 624, 627, 628; 105/368 T, 376, 382, 397, 482, 494; 160/135; 244/118 R, 118 P, 119, 131, 215; 248/393, 501.3

[56] References Cited

U.S. PATENT DOCUMENTS

| | | | |
|---|---|---|---|
| 2,078,491 | 4/1937 | Grahm | 52/241 |
| 2,329,133 | 9/1943 | Peed, Jr. | 244/215 |
| 2,605,064 | 7/1952 | Davis | 244/118 R |
| 2,710,731 | 6/1955 | Bright et al. | 244/118 P |
| 2,877,970 | 3/1959 | Albertine et al. | 244/119 |
| 2,925,050 | 2/1960 | Candlin, Jr. | 105/397 |
| 3,037,593 | 6/1962 | Webster | 160/135 X |
| 3,135,026 | 6/1964 | Fridolph | 52/285 X |
| 3,182,767 | 5/1965 | Kuehl | 52/265 X |
| 3,282,229 | 11/1966 | Elsner | 105/368 T |
| 3,350,830 | 11/1967 | Smith, Jr. et al. | 52/509 |
| 3,357,145 | 12/1967 | Grossman | 52/235 |
| 3,416,274 | 12/1968 | Webb | 52/272 |
| 3,652,050 | 3/1972 | Marrujo et al. | 248/393 X |
| 3,861,103 | 1/1975 | Rasmussen | 52/241 |

Primary Examiner—Stephen G. Kunin
Assistant Examiner—Howard Beltran
Attorney, Agent, or Firm—H. Gus Hartmann; Bernard A. Donahue

[57] ABSTRACT

An anchor fitting assembly for attaching a full width partition, having a door opening, to the fuselage structure of an airplane for dividing a passenger area into two or more compartments. During installation of the partition, provisions are made to allow the lower attachments, of the partition to the seat tracks in the floor of the compartment, to have a certain amount of freedom of movement in both the inboard/outboard and up/down directions. This floating action in the attachment is required for absorbing fuselage deflections due to flight loads imposed on the floor beams and in some cases due to torsional deflections of the wing torque box to which the seat track is fixedly attached, in order to maintain a square door opening.

8 Claims, 10 Drawing Figures

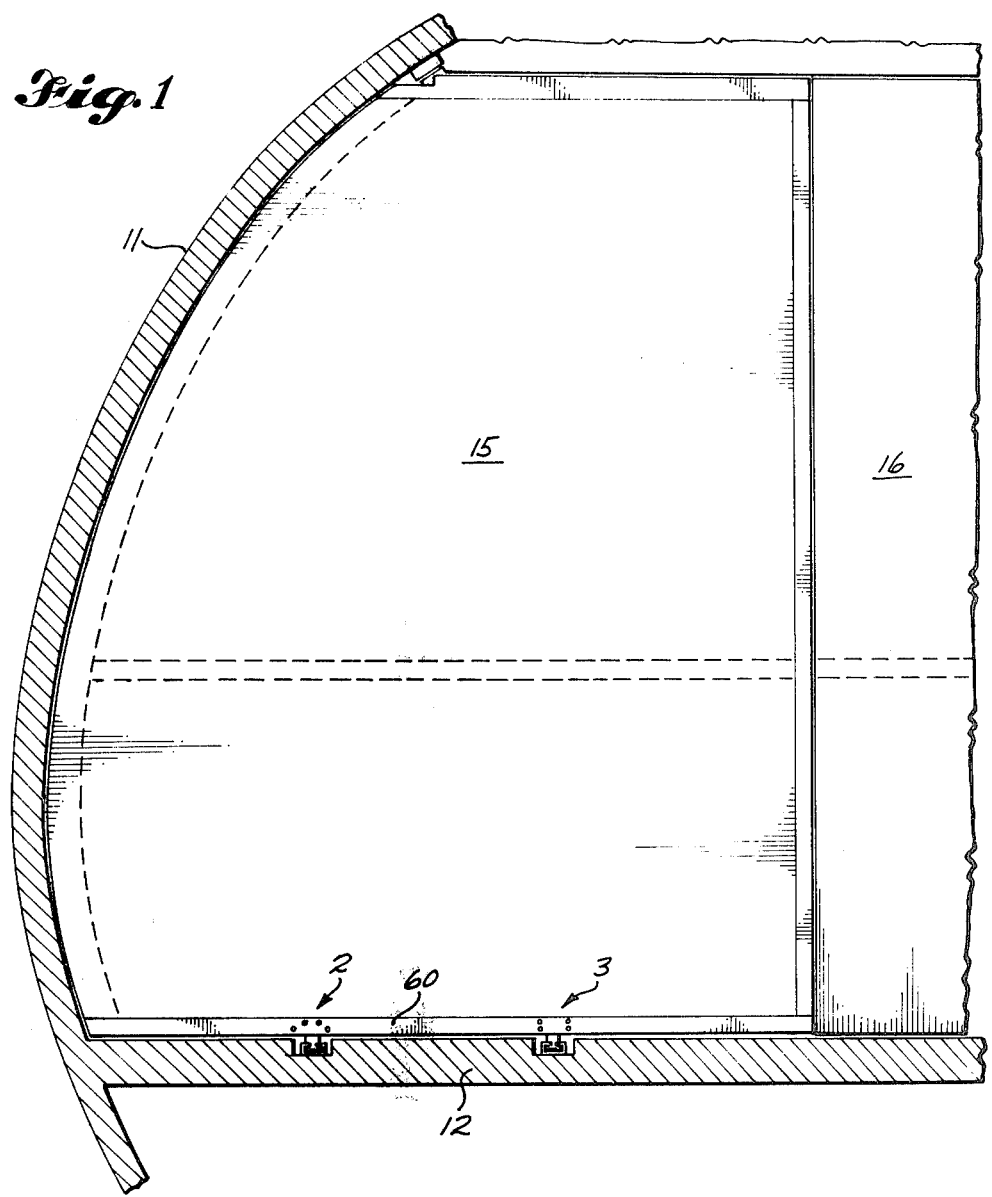
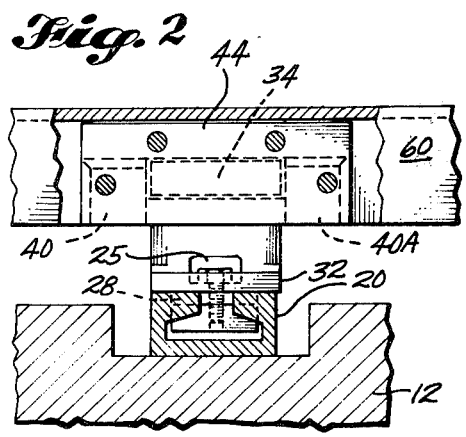
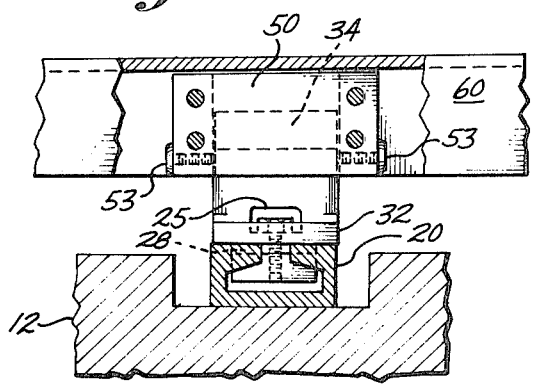

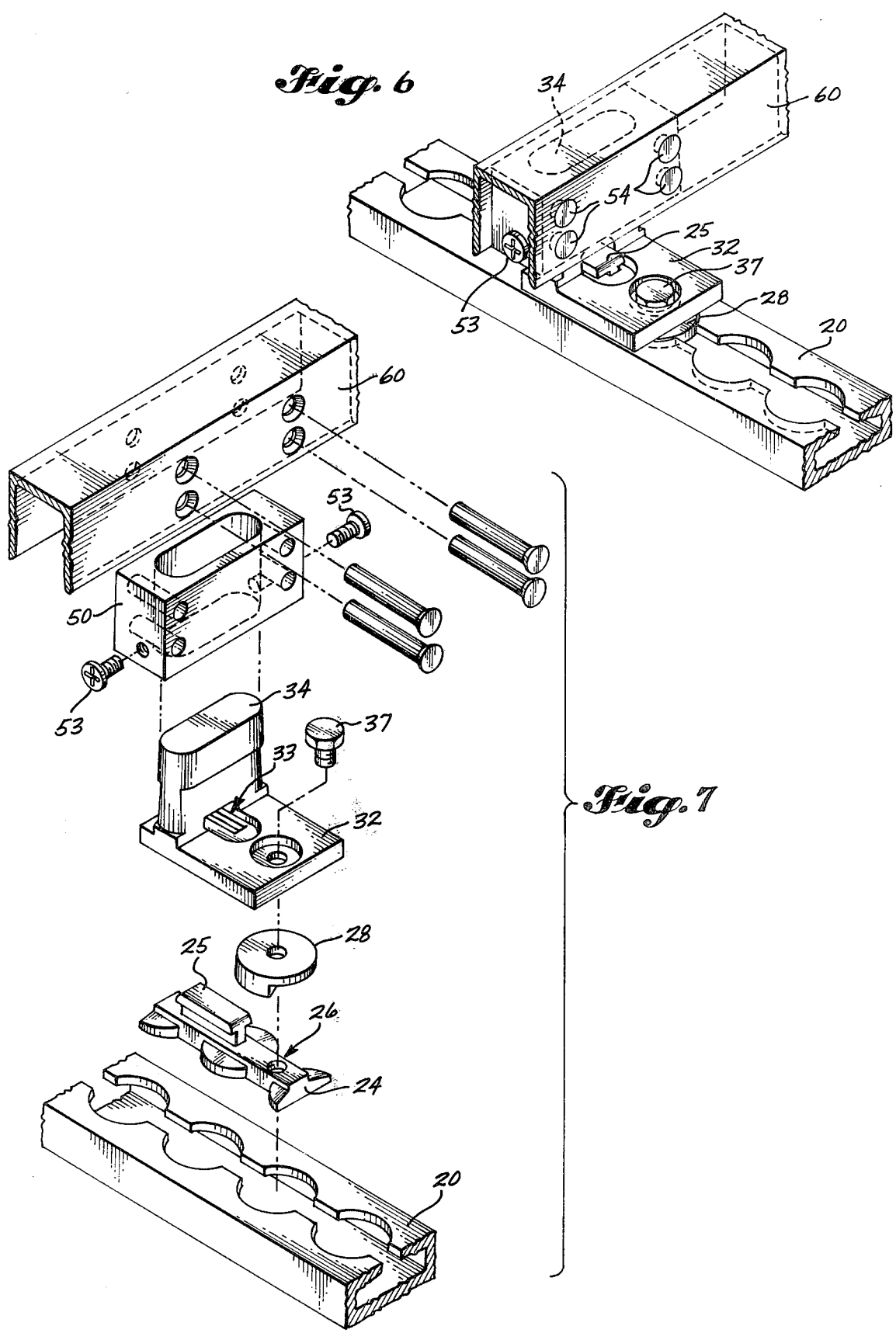

4,185,799

AIRCRAFT PARTITION MOUNTING ASSEMBLY

SUMMARY OF THE INVENTION

The invention relates to a partition mounting assembly for aircraft applications wherein loose connections are desired due to flight loads; and more particularly, to an anchor fitting assembly for attaching a full width partition, having a door in the center, to seat tracks which are in the floor of a compartment in an aircraft; so as to divide the area into two or more compartments. The anchor fitting assembly allows the partition to float, relative to the seat tracks, in both the inboard/outboard and up/down directions; in order, that the door opening in the partition is maintained square or undistorted due to fuselage flexing motions and to accommodate thermal expansion.

There exists the requirement in certain situations for different types of fittings: in one case, the fitting should have the capability of up/down float; in another, the capability of some degree of side float for tolerances and to take up deflections in the floor; and in a third instance, the capability of a rigid fitting which would take load in the up/down direction. In order to fulfill these requirements with present known fittings, would require quite an assortment. However, the present invention has the capability to provide one family of fittings that have the capability for use in several different situations. Due to the similarity of certain elements throughout the different functioning anchor fitting assemblies or embodiments of the present invention, the total number of parts necessary to carry in inventory, is substantially less than that required by the present known method of utilizing a completely different set of parts for each type of fitting assembly. Also, in most instances of partition installation, the use of prior known anchor fitting assemblies, would result in the base or bottom edge of the partition ending up about an inch above the floor; and for some specific type of executive airplanes requiring an extremely ornate interior, such as Shahs and kings, a raised partition with visible gaps thereunder and protruding or obvious fittings, would not be acceptable. Therefore, the present invention further provides anchor fitting assemblies that will allow the partition to be brought right down close to the floor of the compartment, so that when a carpet is laid, it will appear as though the partition is built directly into the floor of the airplane, instead of being set in afterwards.

Another advantage of the present invention is that the anchor or attach fitting assembly can be installed within relatively thin walled partitions of approximately one inch in thickness, in addition to permitting the partition to fit flush to the floor carpet. This is important in the passenger areas, especially in V.I.P. configurations wherein the appearance is critical. A seat track fitting attachment, which is confined dimensionally to the one inch thickness of a partition and which can be covered by the subsequent installation of a floor carpet, is essential in such installations.

Another advantage is that the anchor fitting assembly permits initial adjustment of the partition during installation and then the partition is relatively fixed in place with a certain amount of freedom of movement for accommodating fuselage deflections.

BRIEF DESCRIPTION OF THE DRAWINGS

FIG. 1 is approximately one-half of a cross-sectional view of an airplane fuselage showing a partition, having a centrally located door, for dividing a passenger compartment; and anchor fitting assemblies for attaching the bottom edge of the partition to seat tracks in the floor of the compartment.

FIG. 2 is an enlarged detail front view of the outboard anchor fitting assembly indicated by the numeral 2 in FIG. 1 and depicts a fixed fitting which allows the partition to transmit partition load directly into the seat track from all directions.

FIG. 3 is an enlarged detail front view of the inboard anchor fitting assembly indicated by the numeral 3 in FIG. 1, which allows for deflection of the floor without moving the partition; i.e., the fitting can float in and out of the partition in an up/down direction with deflection of the floor.

FIG. 6 is an enlarged detail perspective view of the anchor fitting assembly shown in FIG. 3.

FIG. 7 is an exploded detail perspective view of the anchor fitting assembly shown in FIG. 6.

DETAILED DESCRIPTION OF THE DRAWINGS

Figure 4:
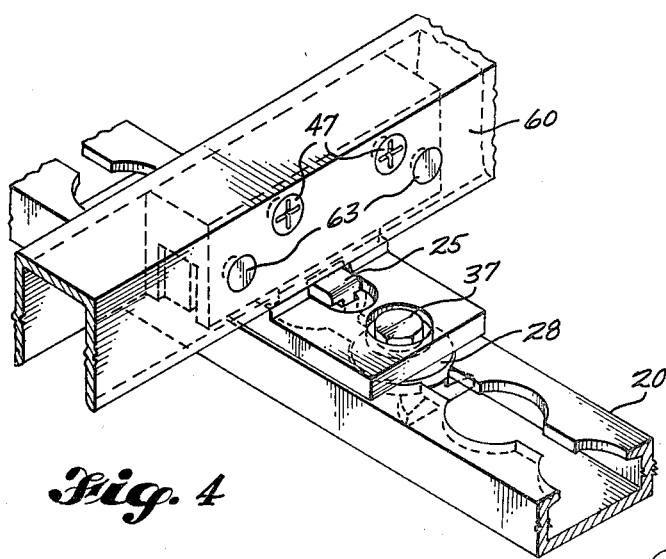
FIG. 4 is an enlarged detail perspective view of the anchor fitting assembly shown in FIG. 2.

FIG. 1 is a cross-sectional view of an airplane fuselage 11 having a structural floor 12 for supporting a plurality of laterally spaced seat tracks 2 and 3 which run substantially parallel down the length of the passenger compartment. A partition 15, having a centrally located door 16 extends transversely in the interior of the compartment and is removably installed to the floor through a series of anchor fitting assemblies 2 outboard and 3 inboard; which assemblies are shown in greater detail throughout the remainder of the FIGS. 2-10.

With respect to the outboard anchor fitting assembly shown in FIGS. 1, 2, 4, 5 and 8, during initial installation of the partition 15, the receptacle 44 is inserted into the channel 60 which is at the bottom edge of the parition 15; and said receptacle 44 is fixedly attached to the partition with two ¼ inch diameter rivets 63 which are inserted through the legs of the partition channel 60. The loads acting on the partition 15 are transmitted directly to the seat track 20, which is structurally attached to the floor 12 of the aircraft compartment 11, through primary load carrying components.

The primary load carrying components comprises: a foot 24, a retainer 28 and an attach angle 32. For assembling the primary load carrying components, the foot 24 is dropped or inserted into the seat track 20 and slid along the track half-way between two adjacent circular openings. Then the retainer 28 is inserted into one of the circular openings in the seat track 20, aligned with a threaded hole 26 in the foot 24 and pushed down onto the foot 24 for locking it from sliding movement in the seat track 20. The attach angle 32 has a cut-out or slot 33 for slidably engaging a raised Tee-section 25 which is integral with the foot 24; and a bolt 37 is inserted through the attach angle 32 and retainer 28, and engages the threaded hole 26 in the foot 24 for clamping the three components tightly to the seat track 20.

Figure 9:
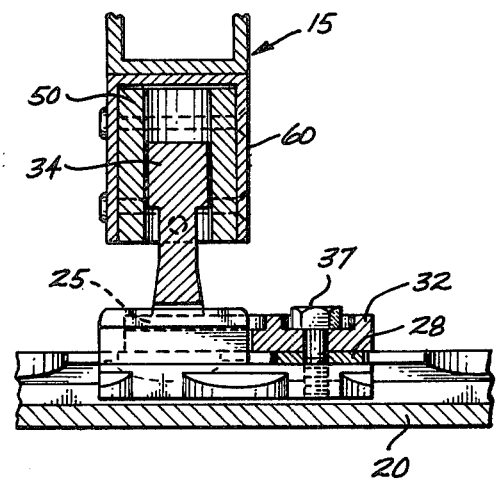
FIG. 9 is a side cross-sectional view of the anchor fitting assembly shown in FIGS. 3, 6 and 7.
Figure 10:
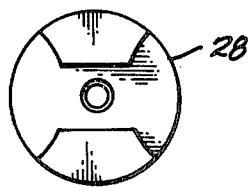
FIG. 10 is a bottom view of the circular retainer element 28.

The attach angle 32 is adapted to cooperate with either receptacle 44, which permits inboard/outboard floating, or receptacle 50, depicted as the inboard fitting 3 of FIG. 1 and shown in the detailed views of FIGS. 6, 7 and 9 which permits up/down floatation. In addition, the receptacle 44 may be converted to a rigid connection by way of a pair of eccentrically drilled retainer blocks 40 and 40A. The receptacle 44 which provides for a rigid connection and for the inboard/outboard floatation of the partition, is intended for use at the outboard seat tracks, as shown at 2 of FIG. 1, when the full closure partition 15 having a passage door 16, is installed.

The receptacle 44 comprises a channel section which is modified by having the interior lower end of each leg of the channel, include a protruding lip or internal flange 45 for slidably engaging the undersurface of a boss 34 integral with the attach angle 32. The attach angle boss 34 is inserted into the receptacle 44 from either side and is retained therein by filler blocks 40 and 40A at each end. The filler blocks 40 and 40A are secured between the legs of the receptacle channel section 44 by countersunk screws 47 which are inserted: through both legs of the partition channel 60, and through both legs of receptacle channel 44; and into a threaded hole in each of the blocks 40 and 40A. The threaded mounting holes in the filler blocks 40 and 40A, are eccentrically located for providing either inboard/outboard floatation of the partition, or a non-floating action of the partition, depending upon whether they are installed as shown for a rigid connection or rotated 180° for inboard/outboard floatation. The filler blocks 40 and 40A are rotated 180° from the position as shown, within the channel 44 at either end thereof, so that the attach angle boss 34 may move approximately 0.15 inches on either side of the centerline position.

When the receptacle 44 is installed at the two outboard seat tracks, it will take fore/aft and up/down loads, and will carry the weight of the partition at these two outboard fittings so that the two inboard fittings can allow the partition to float up/down.

The partition anchor fitting assembly, having a float capability, is required in order to allow the seat tracks to move together during flight, without causing the doorway to distort and bind-up the door operation.

Figure 5:
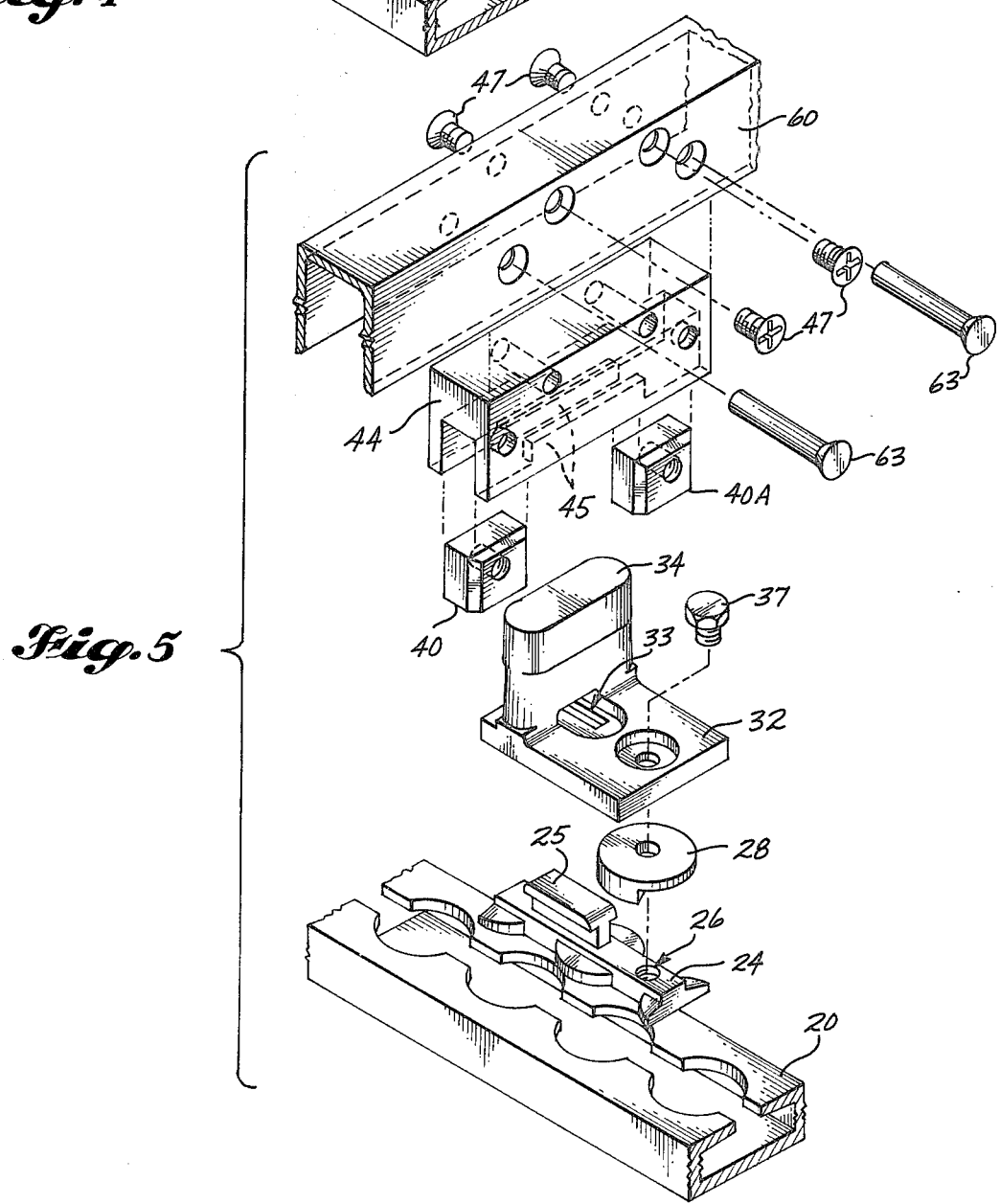
FIG. 5 is an exploded detail perspective view of the anchor fitting assembly shown in FIG. 4.
Figure 8:
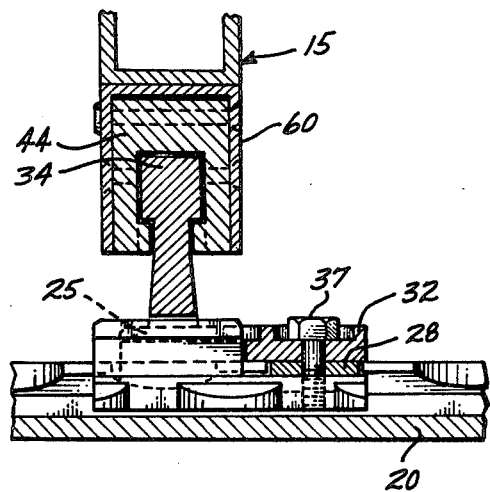
FIG. 8 is a side cross-sectional view of the anchor fitting assembly shown in FIGS. 2, 4 and 5.

For modifying the receptacle 44 to provide a non-floating action to the partition, the filler blocks 40 and 40A are rotated 180° about their threaded hole axis, so that they are in an abutment relationship with the attach angle boss 34 as shown in FIGS. 2 and 5. So modified, the receptacle 44 is then capable of transmitting inboard/outboard partition loads directly to the seat track and can be utilized for partition anchor fittings that do not require any floatation capability.

Referring to the inboard anchor fitting assembly 3 shown in FIG. 1 and the detailed fitting shown in FIGS. 3, 6, 7 and 9, the receptacle 50, provides for the up/down floatation of the partition and comprises a hollow open-ended box section having an inner surface contour which substantially matches the outer surface contour of the attach angle boss 34 for sliding engagement therewith. For initial installation, the receptacle 50 is placed onto the attach angle boss 34 and retained for handling by screws 53 which are threaded through both sides of the receptacle; then, the receptacle 50 is inserted between the legs of the channel 60, in the bottom edge of the partition, and fastened thereto with four rivets 54. The receptacle 50 allows for up/down floor deflection of approximately 0.40 inches up and 0.15 inches down, and is intended for use at the inboard seat tracks where it transmits fore/aft and side loads to the seat track.

The foot 24 and retainer 28, in addition to their use as a partition tie-down, can be adapted for engaging and tieing down a variety of brackets fastened to furniture or other odd sized articles. Since the foot 24 and retainer 28 do not depend entirely on the bolt 37 for connecting the attach angle 32 to the seat track, but more on the interlocking action of the raised Tee-section 25 with the slot 33 in the base of the attach angle 32, there is a higher load carrying capability with this arrangement than with other known, commonly used fittings.

What is claimed is:

1. An attach fitting assembly for installing a removable article in the interior of an aircraft fuselage having a seat track structurally attached to the floor of the fuselage, said attach fitting assembly comprising: said seat track defining an inverted T-slot channel member, having sequentially spaced circular cut-outs in the upper surface thereof; a foot member defining an elongated base contoured for insertion into said seat track and to be slid along in said track a distance half-way between two adjacent circular openings for vertical retention thereby; said foot member having an upright T-rail section aligned with said elongated base and structurally integral therewith, for extending above said seat track when the base of said foot member is inserted into said seat track; a retainer contoured for insertion into one of the circular openings in said seat track and having an undersurface for mating with the base of said foot member, for locking said foot member against sliding motion in said seat track; an attach angle defining a base member and an upright boss; said attach angle base member having a slot therein for slidably engaging said raised T-rail section of said foot member and being retained thereby against vertical movement; means inserted through said attach angle, said retainer and threadably engaging said foot member, for clamping these three components tightly to the seat track; a receptacle being fixedly attached to said article and adapted for engaging said upright boss for connecting said article to the floor of the aircraft fuselage.

2. The attach fitting assembly as set forth in claim 1, wherein said receptacle has a contoured opening for a mating insertion of said upright boss to allow vertical floatation of said article relative to the floor of the aircraft fuselage.

3. The attach fitting assembly as set forth in claim 1, wherein said upright boss defines a T-rail; and said receptacle has a T-slot channel for slip-fit engagement of said upright boss T-rail, to allow an inboard-to-outboard floating action of said article relative to said seat track in the floor of the aircraft fuselage.

4. The attach fitting assembly as set forth in claim 3, including filler blocks being insertable from either end of said T-slot channel of said receptacle, adjacent to said upright boss, and being rigidly fastened in position for limiting the amount of inboard-to-outboard floating action of said article relative to said seat track in the floor of the aircraft fuselage.

5. Apparatus for installing a removable partition in the fuselage of an aircraft, comprising: seat tracks defining a plurality of laterally spaced and substantially parallel longitudinally, inverted T-slot channel members, having sequentially spaced circular cut-outs in the upper surface thereof, and being secured to the floor of the aircraft fuselage; said partition extending transversely in the interior of the fuselage forming a separator, and having an inverted U-shape channel defining the lower edge thereof; anchor fitting assemblies interposed between said partition lower edge portion and said seat tracks for forming a connecting means therebetween; one of said anchor fitting assemblies comprising a foot member, a retainer, an attach angle and a receptacle; said foot member defining an elongated base contoured by having sequentially spaced circular protrusions for matching insertion into said seat track and to be slid along in said track a distance half-way between two adjacent circular openings for vertical retention thereby; said foot member having an upright T-rail section aligned partially with the length of said elongated base and structurally integral therewith, for extending above said seat track when the base of said foot member is inserted into said seat track; said retainer being contoured for insertion into one of the circular openings in said seat track and having an undersurface for mating with the remaining length of the base of said foot member, for locking said foot member against sliding motion in said seat track; said attach angle defining a base member and an upright boss; said attach angle base member having a slot therein for slidably engaging said raised T-rail section of said foot member and being retained thereby against vertical movement; means inserted through said attach angle, said retainer and threadably engaging said foot member, for clamping these three components tightly to the seat track; said receptacle being contoured for mating insertion into the inverted U-shaped channel defining the lower edge of said partition and being fixedly attached thereto; and said receptacle being adapted for engaging said upright boss for restraining said article against longitudinal movement relative to the floor of the aircraft fuselage.

6. The attach fitting assembly as set forth in claim 5, wherein said receptacle has a contoured opening for a mating insertion of said upright boss to allow vertical floatation of said article relative to the floor of the aircraft fuselage.

7. The attach fitting assembly as set forth in claim 5, wherein said upright boss defines a T-rail; and said receptacle has a T-slot channel for slip-fit engagement of said upright boss T-rail, to allow an inboard-to-outboard floating action of said article relative to said seat track in the floor of the aircraft fuselage.

8. The attach fitting assembly as set forth in claim 7, including filler blocks being insertable from either end of said T-slot channel of said receptacle, adjacent to said upright boss, and being rigidly fastened in position for limiting the amount of inboard-to-outboard floating action of said article relative to said seat track in the floor of the aircraft fuselage.

* * * * *